US007068723B2

(12) United States Patent
Foote et al.

(10) Patent No.: US 7,068,723 B2
(45) Date of Patent: Jun. 27, 2006

(54) METHOD FOR AUTOMATICALLY PRODUCING OPTIMAL SUMMARIES OF LINEAR MEDIA

(75) Inventors: Jonathan T. Foote, Menlo Park, CA (US); John Boreczky, San Leandro, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 737 days.

(21) Appl. No.: 10/086,817

(22) Filed: Feb. 28, 2002

(65) Prior Publication Data

US 2003/0161396 A1    Aug. 28, 2003

(51) Int. Cl.
*H04N 7/18*    (2006.01)
(52) U.S. Cl. ............... 375/240.25; 382/224; 382/165; 382/225
(58) Field of Classification Search ........... 375/240.04, 375/240.03, 240.01–240.29; 382/160–230
See application file for complete search history.

(56) References Cited

U.S. PATENT DOCUMENTS

| | | | |
|---|---|---|---|
| 5,655,058 A | | 8/1997 | Balasubramanian et al. |
| 5,664,227 A | * | 9/1997 | Mauldin et al. ............. 715/516 |
| 5,802,361 A | * | 9/1998 | Wang et al. ................. 382/217 |
| 5,872,865 A | * | 2/1999 | Normile et al. ............. 382/224 |
| 5,890,152 A | * | 3/1999 | Rapaport et al. ............... 707/6 |
| 5,918,223 A | | 6/1999 | Blum et al. |
| 6,304,864 B1 | * | 10/2001 | Liddy et al. .................. 706/15 |
| 6,549,643 B1 | * | 4/2003 | Toklu et al. ................. 382/107 |

OTHER PUBLICATIONS

Berry, M., et al. "Using Linear Algebra for Intelligent Information Retrieval", Technical Report CS-94-270, Dept. of Computer Science, University of Tennessee, Knoxville, TN, 1994.
Church, K., et al. "Dotplot: A Program for exploring Self-Similarity in Millions of Lines of Text and Code" in J. American Statistical Association, vol. 2, No. 2, pp. 153-174, 1993.
Logan, B., et al., "Music Summarization Using Key Phrases," in Proceedings of the International Conference on Acoustics, Speech and Signal Processing '00, 2000, IEEE.

(Continued)

*Primary Examiner*—Andy Rao
(74) *Attorney, Agent, or Firm*—Fliesler Meyer LLP

(57) ABSTRACT

Optimal summaries of a linear media source are automatically produced by parameterizing a linear media source. The parameterized linear media source is used to create a similarity array in which each array element includes the value of a similarity measurement between a two portions of the parameterized media signal. A segment fitness function, adapted for measuring the similarity between a segment of the parameterized media signal and the entire parameterized media signal, is optimized to find an optimal segment location. The portion of the linear media source corresponding to the optimal segment location is selected as the optimal summary. This method produces optimal summaries of any type of linear media, such as video, audio, or text information.

22 Claims, 4 Drawing Sheets

OTHER PUBLICATIONS

Boreczky, J., et al., "Comparison of Video Shot Boundary Detection Techniques," in Proceedings of the SPIE Conference on Storage and Retrieval for Still Image and Video Databases IV, San Jose, CA, Feb. 1996, pp. 170-179.

Scheirer, E., "Tempo and Beat Analysis of Acoustic Musical Signals," Journal of the Acoustical Society of America, 103(1), Jan. 1998, pp. 588-601.

Goto M., et al, "Beat Tracking System for Acoustic Signals of Music," in Proceedings of ACM Multimedia 1994, San Francisco, Oct. 1994, pp. 365-372.

Goto, M., et al., "Real-time Rhythm Tracking for Drumless Audio Signals—Chord Change Detection for Musical Decisions." IJCAI-97 Workshop on Computational Auditory Scene Analysis, pp. 135-144.

Lienhart, R., et al., "Video Abstracting," Communications of ACM, Dec. 1997.

Cooper, M., et al. "Scene Boundary Detection Via Video Self-similarity Analysis," In Proceedings of the International Conference on Image Processing, Thessaloniki, Greece. Oct. 7-10, 2001.

* cited by examiner

METHOD FOR AUTOMATICALLY PRODUCING OPTIMAL SUMMARIES OF LINEAR MEDIA

FIELD OF THE INVENTION

The invention relates to a method for automatically producing optimal summaries or excerpts of linear media.

BACKGROUND OF THE INVENTION

There exists a large number of applications which employ multimedia information. However, it cumbersome for users and applications to effectively manipulate multimedia information due to the nature of multimedia information. Multimedia information is often stored in digital data files. These files require a large amount of storage, making manipulation of the multimedia information by applications computationally expensive. If the digital data file is stored on a network, access to the digital data file by applications is hindered by limitations on network bandwidth.

In addition to the difficulties presented to applications by multimedia information, users are also challenged by multimedia information. Multimedia information, such as motion pictures or music, is time dependent media. Because it is time dependent, it is often not practical for users to audit an entire work. For example, if a motion picture search engine returns many results, each lasting 90 minutes or more, the user will not have time to investigate each result. In another example, a music e-commerce website may offer music for prospective buyers to audition. It is burdensome for users to listen to an entire song in order to determine whether they like it. Additionally, by providing users with access to complete songs, the website operator has essentially given away its merchandise and discouraged users from purchasing music.

In practically every application, it is desirable to have a summary of the multimedia information. One type of summary is an excerpted segment of the multimedia information. In order to be an effective summary, it is highly desirable that the segment be a good representation of the entire work. Unfortunately, existing algorithms for producing summaries do little to ensure that the summary is representative of the longer multimedia information.

One prior approach to producing a summary is to always select a specific time segment of the multimedia information for the summary. For example, this approach might always select the first 30 seconds of an audio track as the summary. The results of this crude approach may be very unsatisfying if, for example, the bulk of the audio track bears little resemblance to an idiosyncratic introduction.

Other prior approaches to automatic summarization must be specifically tailored to the specific type of multimedia information. For video summarization, video is partitioned into segments and the segments are clustered according to similarity to each other. The segment closest to the center of each cluster is chosen as the representative segment for the entire cluster. Other video summarization approaches attempt to summarize video using various heuristics typically derived from analysis of closed captions accompanying the video. These approaches rely on video segmentation, or require either clustering or training.

Audio summarization techniques typically use a segmentation phase to segment the audio into segments. Typically, this is done by looking for audio features such as silence or pitch. Representative segments are then selected based on various criteria. If these features are absent from a particular multimedia source, these techniques perform poorly.

Text summarization typically uses term frequency/inverse document frequency to select paragraphs, sentences, or key phrases that are both representative of the document and significantly different from other documents. This requires knowledge about the content of other documents.

It is desirable to have a method for producing automatic summaries which 1) is capable of working on any type of multimedia information; 2) produces a good representation of the entire work; 3) does not depend on specific features of the multimedia information; and 4) requires no segmentation, clustering, or training. Additionally, it is advantageous to have a method which can easily produce a summary of the desired length.

SUMMARY OF THE INVENTION

According to the invention, generally, a method for automatically producing an optimal summary of a linear media source comprises a first step of parameterizing the linear media source to produce a parameterized media signal. The parameterized media signal is used to create a similarity array. Each array element includes the value of a similarity measurement between two portions of the parameterized media signal. A segment fitness function can be calculated for any possible segment of the parameterized media signal, measuring the representative similarity between the segment and the entire parameterized media signal. The segment fitness function is optimized to find an optimal segment location. The segment which optimizes the segment fitness function is the best representative segment, and the portion of the linear media source corresponding to the optimal segment location is selected as the optimal summary.

In an embodiment, the linear media source is parameterized by separating the linear media source into a set of media frames. A parameterization is applied to each media frame in order to produce a feature vector. The feature vectors for each media frame are aggregated in order to produce the parameterized media signal. Examples of parameterizations include frequency domain transforms and tokenizations. In an alternate embodiment, the linear media source is extracted from a linear media data file in parameterized form.

In an embodiment, the similarity array comprises a two dimensional matrix. Each row and each column corresponds to a portion of the parameterized media signal. Each matrix element includes the value of the similarity measurement between the feature vector associated with the row of the matrix element and the feature vector associated with the column of the matrix element.

Examples of the types of similarity measurements used include vector similarity measurements, such as the Euclidean distance or scalar (dot) product between the feature vectors. Similarity measurements may also employ a vector correlation between two groups of feature vectors. The similarity measurement may be weighted. One example of a weighting is a Term-Frequency/Inverse Document Frequency weighting.

In an embodiment, the segment similarity function is the average similarity measurement between a candidate segment and the entire parameterized media signal. In a further embodiment, the segment similarity function further may be weighted with a weighting function in order to emphasize the similarity measurement of a desirable portion of the linear media source.

In an embodiment, a segment similarity function for an optimal segment of a predetermined length is optimized using a one-dimensional optimization. If the length of the optimal segment is not predetermined, the segment similarity function is optimized to find the optimal segment location and length.

In a further embodiment, a second optimal summary is found by removing the optimal segment from the similarity array and repeating the method on the modified similarity array.

An embodiment of the invention is capable of working with any type of linear media source, for example video, audio, or text information.

SUMMARY OF THE FIGURES

The present invention will be described with reference to the drawings, in which.

DETAILED DESCRIPTION

Figure 1:
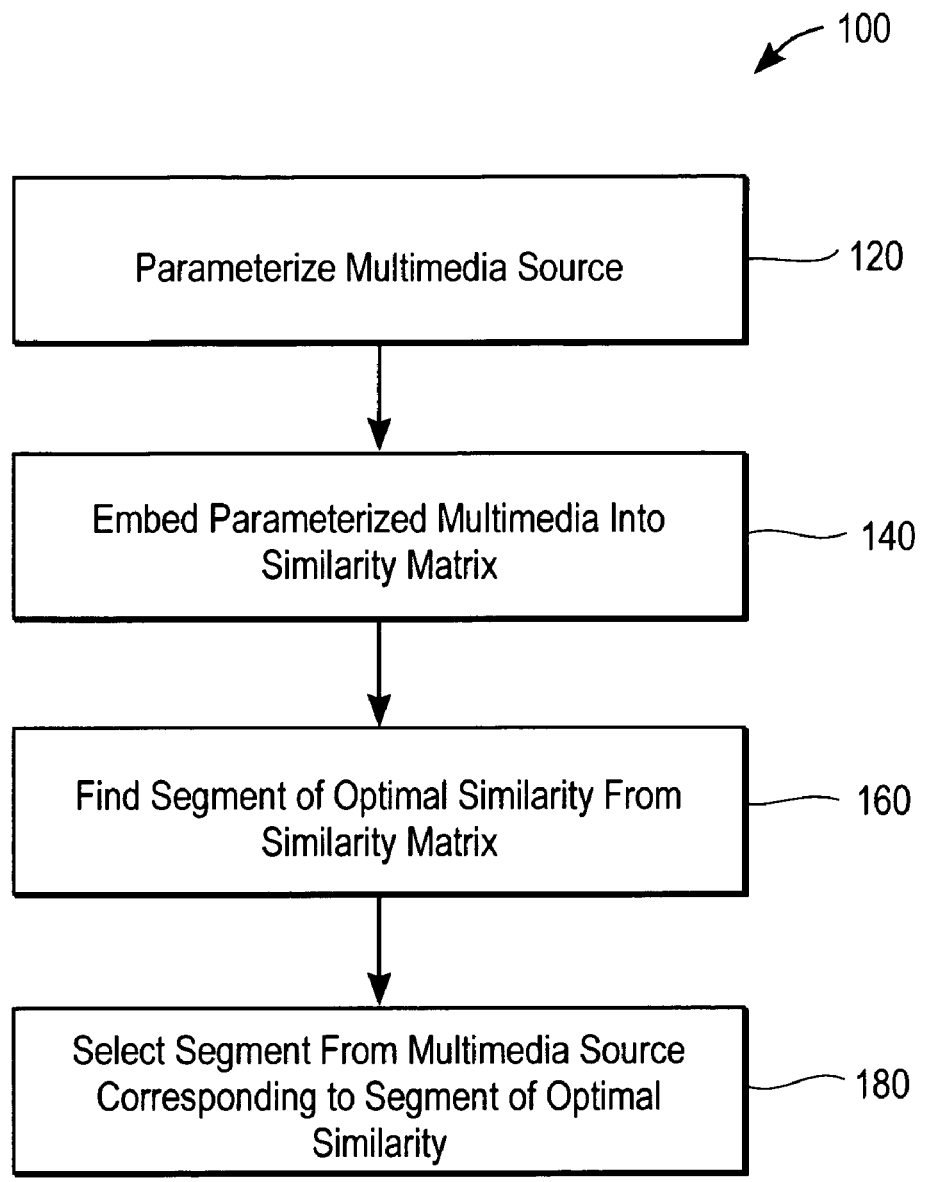
FIG. 1 illustrates a block diagram of an embodiment of the method of the present invention.

The invention addresses the shortcomings associated with other methods of producing summaries of multimedia information. In particular, the invention automatically produces summaries or excerpts of any type of linear media. Linear media is multimedia in which the multimedia information is a function of a one-dimensional variable. Examples of linear media include audio and video, where the multimedia information may be presented as a function of time, and text documents, where the multimedia information is a discrete function of document position.

The summaries produced by the invention are good representations of the entire work. One way of determining whether a summary is a good representation of the entire work is to measure the degree of self-similarity between the summary and the entire work. For a given definition of similarity, an optimal summary is defined as that segment which maximizes the self-similarity between that segment and the entire work. The optimal summary has the probabilistic interpretation that any infinitesimal portion of optimal summary is more likely to resemble an infinitesimal portion of the entire work than one taken from any other summary. An embodiment of the invention generates an optimal summary of the entire multimedia information by maximizing the summation of the self-similarity matrix over the support of the segment.

Additionally, the invention does not depend on specific features of the multimedia information. In an embodiment, the invention produces a summary independent of the semantic content of the multimedia information. This allows the invention to operate without the need for segmentation, clustering, or training.

Further, the invention can determine an optimal summary of any time-dependent or linear data where some measure of point-to-point similarity can be computed. The enables the invention to be adapted to a number of different useful applications, several examples of which are discussed below.

The invention can summarize audio, video, or text, by finding a short segment that best characterizes the entire work. In one example application, this allows potential customers to preview a free sample of a larger media source prior to purchase. Optimal summaries improve a vendor's ability to entice customers to make a purchase.

Another example application is to use representative summaries for media classification, indexing, and retrieval. For large media works, classification, indexing, and retrieval are expensive processes. Using the invention to generate short, optimal summaries of the larger work as proxies for the classification, indexing, and retrieval process reduces the overall cost. The fact that the summary is a good representation of the larger work makes this feasible without sacrificing performance.

Video editing is another example application. A video source is divided into separate shots for editing. The invention may be used to reduce the length of each shot by a fixed amount. This is done by generating a representative summary of the desired length for each shot. The representative summaries of each shot may be concatenated to yield a video that has been reduced in time, but preserves all shots and their relative lengths. This technique may be applied similarly to other types of multimedia information.

Another example application employs the invention to find the most representative keyframe for a video shot, or the entire video. This can be done by generating an optimal summary of the video with a length of one frame. Optimal keyframes are useful for a number of applications, such as summarizing videos using keyframes or comic-book representations, or using keyframes as icons for representing shots in graphical video editing applications.

FIG. 1 illustrates an embodiment of the method of the present invention in diagram 100. In the first step 120, the multimedia source is converted into a parameterized multimedia signal. The parameterized multimedia signal is comprised of a set of compact feature vectors. Each feature vector represents a portion of the multimedia source. Typically, each feature vector is smaller in size than the corresponding portion of the source multimedia source to facilitate processing by the method. The type of parameterization is dependent on the type of multimedia information presented. Ideally, the parameterization type should be chosen so that similar portions of the multimedia source have similar feature vectors.

For music or audio information, the multimedia source in an embodiment is a digital audio file. A common format for digital audio is the MPEG-1, Layer 3 (MP3) format. Other digital audio formats may be easily adapted to the present invention. In an alternate embodiment, music or audio may be input into the method as an analog audio signal and converted into a digital audio data file. In this embodiment, the block 120 includes hardware and/or software for converting the analog audio signal into a digital audio signal and storing the digital audio data. In either embodiment, the digital audio file may be stored on a local digital information storage medium, or alternatively, stored on a remote digital information storage medium accessible via a local or wide area computer network. In a further embodiment, stereo or multichannel audio information is averaged to produce a single channel prior to parameterization.

In an embodiment, the audio multimedia source is parameterized by first partitioning or "windowing" the audio waveform into separate portions or frames. Variable frame widths and overlapping can be used to optimize results. In an embodiment, the digital audio source is windowed into frames of N audio samples each. Each frame is overlapped with the preceding and following frames by N/2 samples.

As an example, the value of N may be 256, and the value of N/2 may be 128. For audio sampled at 16 kHz, this results in a frame duration of 16 milliseconds and a frame rate of 125 frames per second. Each frame is parameterized using standard audio analysis methods such as a short-term Fourier Transform (STFT) or Mel-Frequency Cepstral Coefficients (MFCC) analysis.

Applying a transform to an audio frame typically produces a large number of transform coefficients. In an embodiment, audio is commonly parameterized using spectral or MFCC features. Spectral features are the logarithmic magnitude of the Fourier transform of each window. These are averaged over 10–100 linear frequency bins, resulting in a feature vector of 10–100 parameters per audio window. MFCC features take the logarithmic magnitude of the Fourier transform of each window and average them across the non-linear Mel-scale frequency bins. The averaged magnitude values are then transformed using a Discrete Cosine Transform (DCT). The higher order DCT coefficients are discarded, leaving a feature vector of 8–12 parameters per audio window. Although the MFCC parameterization has less correlation than spectral features, either of these representations of the audio information of the frame is appropriate for this method since similar frames will have similar transform coefficients, and hence similar feature vectors.

Alternate audio analysis methods which may be used for parameterization include linear prediction methods or psychoacoustic considerations in conjunction with spectrogram analysis. Many audio compression techniques such as MPEG-1, Layer 3 audio represent audio information in a similar manner as the examples discussed above. By using an audio representation to create feature vectors that is also employed in audio compression techniques, this embodiment can produce the parameterized feature vectors directly from a compressed audio data source. This embodiment avoids the expense of audio decompression and decoding normally associated with the processing of compressed audio formats.

For video information, the multimedia source in an embodiment is a video data file. One standard format for digital video is the DV video format. Other digital video formats may be easily adapted to the present invention. The video file may be stored on a local digital information storage medium, or alternatively, stored on a remote digital information storage medium accessible via a local or wide area computer network.

In an alternate embodiment, an analog video signal may be input into the method at block 120. In this embodiment, the block 120 includes hardware and/or software for converting the analog video signal into a digital video signal and storing the digital video data. The video may be input into the method as an analog video signal and converted into a digital video data file. The digital video file may be stored on a local digital information storage medium, or alternatively, stored on a remote digital information storage medium accessible via a local or wide area computer network.

In an embodiment, the video multimedia source is parameterized by transforming each video frame using an orthonormal projection such as the Discrete Cosine Transform (DCT) or Hadamard Transform (HT). This transform may be applied to the whole image at once, or alternatively, the image may be divided into sub-blocks and applied to each sub-block separately.

Applying a transform to an image typically produces a large number of transform coefficients. An embodiment reduces the number of transform components by truncation, principal component analysis, or linear discriminant analysis. In reducing the number of transform coefficients, it is desirable to select components for optimal analysis of the feature vectors, as opposed to optimal reconstruction of the original source, as is done with data compression applications. In one embodiment of the invention, all but the highest-variance transformed components are discarded, resulting in a compact feature vector of 10–30 parameters for each video frame. This representation of the audio information of the frame is appropriate for this method since similar frames will have similar transform coefficients, and hence similar feature vectors.

Alternate parameterization methods can be used to produce feature vectors of the parameterized video signal. Examples include color histogram analysis, as described in Zhang, H.-J., Low, C.-Y., Smoliar, S., and Wu, J.-H., "Video Parsing, Retrieval, and Browsing: an Integrated and Content-Based Solution," in M. Maybury, ed., *Intelligent Multimedia Information Retrieval*, AAAI Press/MIT Press, 1997. Decimated images derived from DC coefficients of compression macroblocks or ranking of brightness of ultra-decimated images may be used as in Mohan, R. (1998). "Video Sequence Matching," in *Proceedings of the International Conference on Acoustics, Speech, and Signal Processing '98*, Seattle, Wash., IEEE. Both of these publications are incorporated by reference herein.

Text information may also be used as the multimedia source. In an embodiment, the text information is stored in a text data file. One standard format for text data is the ASCII data format. Other data formats containing text information, such as those used in conjunction with word processors, electronic publishing or document management systems, or web browsers may be easily adapted to the present invention. The text information file may be stored on a local digital information storage medium, or alternatively, stored on a remote digital information storage medium accessible via a local or wide area computer network.

In an alternate embodiment, a text information signal may be input into the method at block 120. In this embodiment, the block 120 includes hardware and/or software for processing the text information signal into text information and storing the text information as a text information file. Examples of text information signals include text or character input, handwriting input, or voice input. The text information file may be stored on a local digital information storage medium, or alternatively, stored on a remote digital information storage medium accessible via a local or wide area computer network.

In an embodiment, the text information is parameterized by a process of stemming, stop list filtering, and tokenization. Stemming is the process of eliminating the different inflections of each word in order to reduce the word to a root word. For example, the words "remove," "removed," "removing," and "removal" would all be stemmed to the root word "remov." Stemming is performed on each word of the text information.

There are many stemming algorithms known to one of average skill in the art which are readily adapted to this embodiment. Stemming may be performed by analyzing each word ending for the presence of a suffix matching a previously defined suffix. If a suffix is present, criterion associated with each suffix determine whether the suffix may be removed from the word. Alternatively, stemming may be performed in conjunction with a dictionary of root stems.

Following completion of the stemming process, stop list filtering is performed on the stemmed text information. Stop list filtering removes common stop words, such as "a," "the," "and," and "of," that do not distinguish meaning. After the stop words have been removed from the text information, tokenization is performed. Tokenization assigns a unique number or code to all unique remaining word stems. The set of unique token values is referred to as the "dictionary." As explained below, the size of the dictionary determines the length of the feature vector.

In an embodiment, each token's numeric value corresponds to a parameter position in the feature vector. For example, a token with a numeric value of one corresponds to the first parameter of a feature vector. Similarly, a token with a value of two corresponds to the second feature vector parameter. Since each token value corresponds to a feature vector parameter, the feature vector contains the same number of parameters as the total dictionary size.

Feature vectors are created by partitioning or windowing the tokenized text information into separate frames. Variable frame widths and overlapping can be used to optimize results. Examples of typical text windows are a single sentence, a paragraph, or a fixed number of words. In an embodiment, an optimal retrieval length is 24–36 lines of teletext (approximately 100–200 words). In general, the choice of frame widths is a trade off between reliable distance measures and precise summary endpoints. Smaller frame widths allow summaries to be precisely located, but since smaller frames contain fewer words, measuring the similarity of a summary to the larger work is less reliable. Conversely, larger windows will result in better similarity measurements. However, the start and end points of the summary can only located as precisely as the width of the text window.

In an alternate embodiment, boundary information may be used to partition the tokenized text information. For example, it may be desirable to partition the text information by paragraph or sentence. In an embodiment, this may be accomplished by detecting two carriage returns in a row, which may signify the end of a paragraph, or a period followed by a space and a capital letter, which may signify a sentence boundary. Other types of boundary information, such as pagination, may be used in a similar fashion.

Within each window, the quantity of each unique token is counted. The token count defines the value of the feature vector for the window. For a given window, each parameter of the feature vector represents the number of times the corresponding token occurs in the window. Continuing with the above example, if the first token appears three times in the window, and the second token appears once, then the first two parameters of the feature vector for this window will be (3,1).

The following illustrates an embodiment of the parameterization step for text information. Given the following two windows of text information:

TABLE 1

Example Text Information Windows

| Windows | Text Information |
|---|---|
| Window 1 | "Potatoes. I hate potatoes." |
| Window 2 | "Who hates potatoes?" |

After stemming, stop word filtering, and tokenization, the text information appears as:

TABLE 2

Example Tokenized Text Windows

| Windows | Text after Stemming, Stop Word Filtering, and Tokenizing |
|---|---|
| Window 1 | "Potato (1). hate (2) potato (1)." |
| Window 2 | "Who (3) hate (2) potato (1)?" |

In this notation, the token number appears in parenthesis after each word. In this example, the root stem "potato" is assigned a token of (1), the root stem of "hate" is assigned the token of (2), and the word "Who" is assigned the token of (3). Thus, the dictionary for this example is defined as (potato, hate, who) and the feature vector length is three.

Feature vectors are then constructed for each window by counting the number of occurrences of each token. Continuing the example, counting the tokens of each text window results in the following feature vectors:

TABLE 3

Creation of Feature Vectors from Tokenized Text Windows

| Windows | Token Count | | | Feature vector |
|---|---|---|---|---|
| | Potato (1) | Hate (2) | Who (3) | |
| Window 1 | 2 | 1 | 0 | (2,1,0) |
| Window 2 | 1 | 1 | 1 | (1,1,1) |

As shown in the above table, the token for the word "potato" appears twice in the first window, the token for "hate" appears once, the word "who" does not and once in the second window in this example; thus, the first parameter of the feature vector of the first window is 2, the second parameter is 1, and the third parameter is 0. Together, these parameters define a feature vector for the first window of (2,1,0). Similarly, the second window has a feature vector of (1,1,1).

Regardless of the type of multimedia information or the type of parameterization performed, the result of Step 120 is a set of feature vectors corresponding to the source multimedia, referred to as a parameterized multimedia signal. In an embodiment, feature vectors in the parameterized multimedia signal are arranged in the same order as the corresponding multimedia information in the source multimedia.

Following the parameterization of the source multimedia at Step 120, the parameterized multimedia signal is embedded into a similarity matrix for self-similarity analysis in Step 140. Self-similarity analysis is described in J. Foote, "Automatic Audio Segmentation using a Measure of Audio Novelty." In Proc. IEEE International Conference on Multimedia and Expo (ICME) 2000, vol. I, pp.452–455, New York, N.Y., August 2000, which is incorporated by reference herein.

Figure 2:
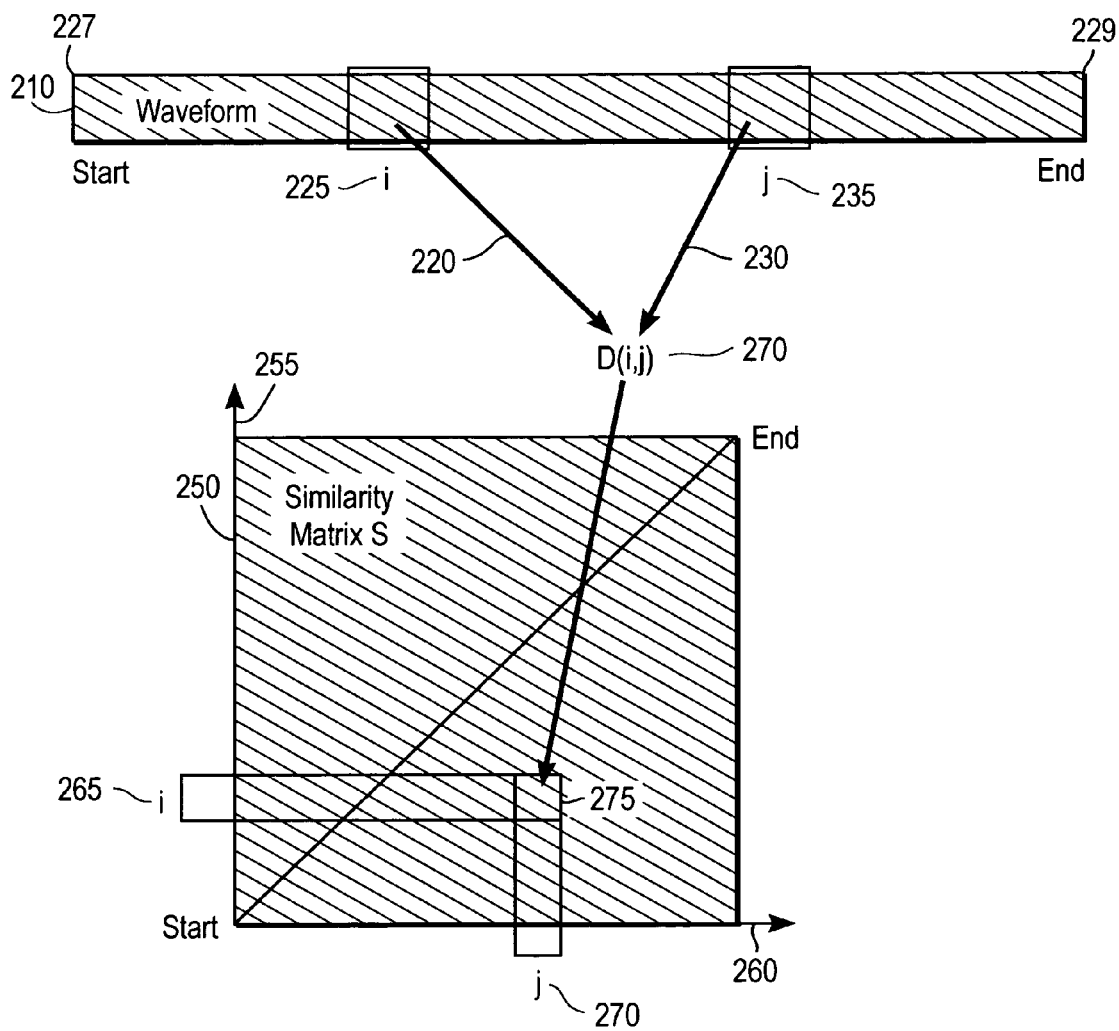
FIG. 2 illustrates an embodiment of a method for embedding parameterized multimedia into a similarity matrix.

FIG. 2 shows the construction of a similarity matrix used for self-similarity analysis of audio and/or video. The parameterized signal 210 arranges the feature vectors in order of their associated multimedia information. Feature vector 220 is the parameterized multimedia information located at signal location (i) 225. Feature vector 230 is the parameterized multimedia information located at signal location (j) 235. Signal locations (i) 225 and (j) 230 correspond to feature vector's time or position in the multimedia source. The value of signal times (i) 225 and (j) 230 can vary from the start of the parameterized signal 227 to the end of the parameterized signal 229.

The key to the self-similarity analysis is the measure of the similarity 270 (D) of feature vectors 220 and 230. The value of similarity 270 (D) is a measurement of the degree of similarity or dissimilarity between feature vectors 220 and 230. One simple measure of similarity 270 is the Euclidean distance between the feature vectors calculated in parameter space. Given feature vectors $v_i$ 220 and $v_j$ 230 located at positions (i) 225 and (j) 235, respectively, the Euclidean distance is calculated by:

$$D_E(i,j) = \|v_i - v_j\|$$

In an alternate embodiment, similarity 270 is the scalar (dot) product of the feature vectors. This value will be large if the feature vectors are large and similarly orientated. A further embodiment normalizes the scalar product to get the cosine of the angle between the feature vectors. This removes the dependence of the similarity measurement on the magnitude of the feature vectors. This similarity measurement 270 may be calculated in the standard manner for computing the cosine of the angle between two vectors, such as $$D_C(i, j) \equiv \frac{v_i \cdot v_j}{\|v_i\| \|v_j\|}$$

This measure of similarity yields a large similarity score even if the feature vectors are small in magnitude. For audio, this is advantageous in that relatively similar regions of low energy are judged just as similar as relatively similar regions of high energy.

For some types of multimedia information, the frame rate is much faster than typical events. An example of this situation is audio or music, where a frame rate, for example 125 frames per second, is much faster than the rate of significant changes in audio or music. A similarity measurement adapted to this type of multimedia information computes a vector correlation over a window of width w. This similarity measurement compares a plurality of consecutive feature vectors at one location with a plurality of feature vectors at a second location. This similarity measurement not only captures events on a slower time scale than the frame rate, but also captures the time dependence, or sequence, of feature vectors in the similarity measurement. In order to have a high similarity score, the feature vectors in a first window must be similar to their counterparts in the second window, and the sequence of feature vectors in each window must be similar in sequence. Given a window of width w and a similarity function D, which may be any of type of distance function, including the embodiments discussed above, the similarity measurement for a vector correlation of feature vectors is:

$$D(i, j, w) \equiv \frac{1}{w} \sum_{k=0}^{w-1} D(i+k, j+k)$$

For parameterized text information, any vector measurement, such as those discussed above, may be used to compute the similarity between two feature vectors. In addition, an embodiment of the invention measures similarity by counting the number of tokens in common between two feature vectors. An alternate embodiment applies separate weights to each token in computing the similarity between two feature vectors. The similarity measurement is the sum of the weights of each token in common between two feature vectors.

In an embodiment, the similarity measurement uses Term-Frequency/Inverse Document Frequency (TF/IDF) weighting, a weighting method for assigning a weight value to each token. The weight value is a combination of the term frequency, a measurement of how frequently a token appears in the original text window, and the inverse document frequency, a measurement of the rarity of a token in the multimedia source as a whole. A token will receive a high weight if it is common in the original text window and relatively rare in the multimedia source as a whole.

In an embodiment, term frequency value (tf) of a token is the number of times a token appears in the text window. Further, the inverse document frequency (idf) of a token (t) is given by:

$$idf(t) = \log N(t) - \log n(t)$$

where N(t) is the total number of text windows in the source multimedia, and n(t) is the number of text windows in which token t appears in. For each token in common between two feature vectors, the weight (W), in an embodiment, may be computed as:

$$W(t) = \frac{idf(t)tf(t)(k+1)}{k((1-b) + bNDL) + tf(t)}$$

where NDL is the size of the text window, and k and b are tuning constants, which moderate the effect of term frequency and document length, respectively, on a token's weight. Typically, b ranges between 0 and 1, while k may be any number, for example 2.

In a further embodiment, if the text window is larger than a few words or a sentence, tokens may occur within text window with different frequencies. If a token (t) appears with frequency QF(t) in a text window, then an adjusted weight (AW) may be computed as:

$$AW(t) = QF(t)W(t)$$

In an alternate embodiment, the weight may be computed through different mathematical combinations of the above discussed feature vector attributes, such as term frequency or document weight, or other attributes derived from the feature vectors or multimedia source.

Regardless of the type of similarity measurement employed, the similarity measurement is a function of two feature vectors of the parameterized multimedia signal. It is convenient to consider all the possible similarity measurements in a parameterized signal. This is done by embedding the similarity measurement into a two-dimensional representation. Square matrix 250 is a two-dimensional representation of the similarity 270 between every feature vector in a parameterized signal. Matrix 250 contains the similarity 270 computed for all combinations of frames in parameterized signal 210.

In matrix 250, the horizontal axis 260 represents all values of signal time (j). Vertical axis 255 represents all values of signal time (i). Vertical axis position 265 corresponds to signal time (i) 225, and horizontal axis position 270 corresponds to signal time (j) 230. Matrix element 275 is located at the intersection of positions 265 and 270. The value of matrix element 275 is the similarity measure 270 computed between feature vector 220 at signal time (i) 225 and feature vector 230 at signal time (j) 235. This computation of similarity is computed for all elements of matrix 250. If similarity measure 270 is symmetrical, i.e. if D(i, j)=D(j, i), then matrix 250 will be symmetrical as well.

Figure 3:
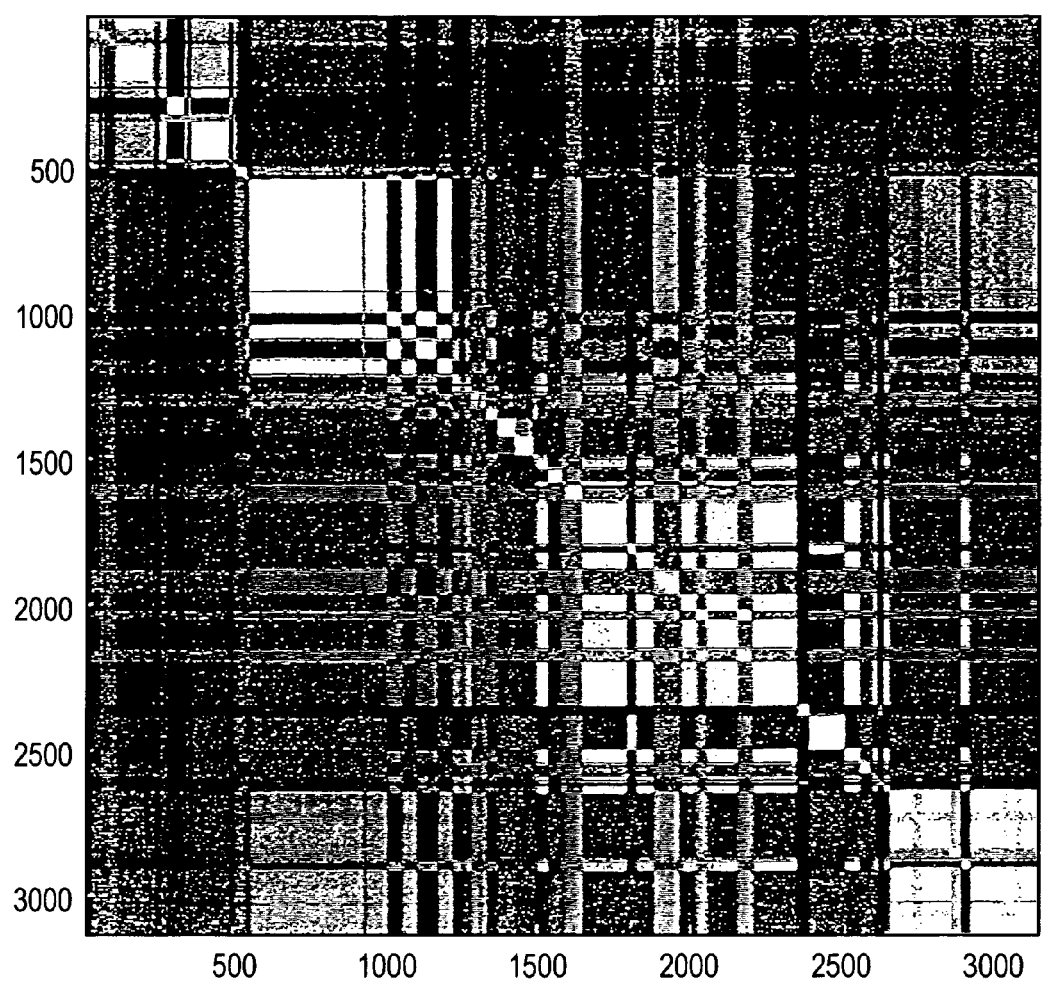
FIG. 3 illustrates a visualization of an example similarity matrix produced by an embodiment of the method of the present invention.

FIG. 3 illustrates a visualization of an example similarity matrix produced by an embodiment of the method of the present invention. Graph 310 is a visualization of a similarity matrix computed from an example parameterized multimedia signal. Each element of graph 310 is shaded with a gray scale value proportional to the similarity value of the element. Bright areas represent high similarity, and dark areas represent low similarity. As an example, a scale runs from 0 to 3000 along both the x and y axes.

Since the main diagonal represents a comparison of a feature vector with itself, the main diagonal of the similarity matrix is clearly visible as a white line (every feature vector is maximally similar to itself). Areas of high similarity, such as audio silence or a static video image, appear as bright squares on the diagonal. Repeated audio sounds or video shots are visible as bright off-diagonal rectangles. If the audio or video has a high degree of repetition, this will be visible as diagonal stripes or checkerboards, offset from the main diagonal by the repetition time. As can seen from graph 310, transitions between distinctive areas of the parameterized multimedia signal, for example, video scene changes, produce a distinctive "checkerboard" pattern.

Looking at each row of the similarity matrix, one can visualize the similarity of a single frame of the multimedia source to the entire multimedia source. As one moves across a given row, the similarity value at a given point in the row represents the similarity between the frame associated with that row and the frame associated with the column intersecting the row at the given point. As a whole, each row of the similarity matrix represents the similarity between the frame associated with the portion of the multimedia source at that time (or position) and the rest of the multimedia source. Since the similarity matrix is symmetrical if the similarity measurement is symmetrical, each column also represents the similarity between the feature vector corresponding to the portion of the multimedia source at that time (or position) and the rest of the multimedia source.

This concept of a row (or column) of the similarity matrix representing the similarity between a frame and the rest of the multimedia source may be extended to find a segment which optimally summarizes the multimedia source. A segment is a contiguous portion of the multimedia source. This corresponds to a contiguous set of rows or columns of the similarity matrix. To find the segment of a work that best represents the entire work, it is desirable that a candidate segment have the maximum similarity to the entire work as compared to all other candidate segments.

Figure 4:
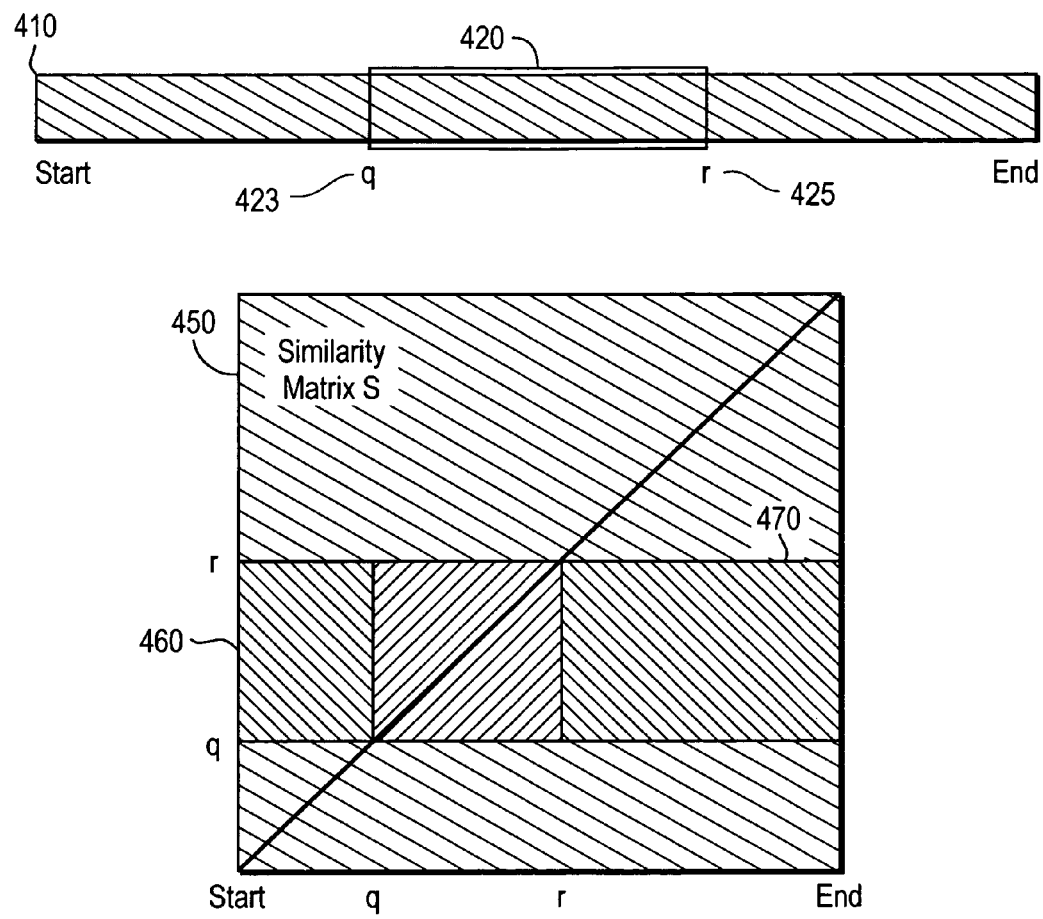
FIG. 4 illustrates an embodiment of a method for locating a segment of optimal similarity from a similarity matrix.

FIG. 4 illustrates an embodiment of a method for locating a segment of optimal similarity from a similarity matrix. Candidate segment 420 is a portion of the parameterized multimedia signal 410. Candidate segment 420 has a start point q 423 and an end point r 425, and length l, which by definition is l=r−q. Similarity matrix 450 is computed as discussed above. Candidate segment 420 corresponds to the set of contiguous rows 460 of similarity matrix 450.

The overall similarity of candidate segment 420 to the multimedia source may be computed by finding the average similarity measurement of the segment. On the similarity matrix 450, the average similarity measurement of a segment is the sum of the similarity measurements of each row of the set 460, normalized by the segment length. Graphically, the average similarity is represented as the sum of all of the similarity measurements in hatched region 470 of the similarity matrix 450, normalized by the area of region 470. This computation of the average similarity may be expressed by:

$$\overline{S}(r, q) = \frac{1}{L(r-q)} \sum_{m=q}^{r} \sum_{l=0}^{L} S(l, m)$$

where L is the length of the entire parameterized multimedia source.

The optimal segment is the candidate segment with the maximum average similarity value. If the desired segment length is unknown, then the function $\overline{S}(r,q)$ is maximized over r and q to find the optimal segment. In an embodiment, the desired summary length l is known in advance, for example, from user input. This allows the optimal segment location to be calculated as the simple one-dimensional maximization of $\overline{S}(q,q+l)$ over start point q 423. This can be computed by enumeration of all possible candidate start points q 423. To simplify this calculation further, in an embodiment, the sum of each row is precomputed and stored. The average similarity of a segment is calculated as the sum of the precomputed row sums of all of the rows in the segment, normalized by the segment length. In an alternate embodiment, the summary location is known in advance, for example, from user input or heuristics. This allows the optimal segment length to be calculated as the simple one-dimensional maximization of $\overline{S}(q,q+l)$ over summary length l, in a manner similar to that described above.

The segment with the highest average similarity value is selected as the optimal segment, and the portion of the multimedia source corresponding to this segment is the optimal summary. In an embodiment, multiple optimal summaries are located by maximizing the average similarity function over all possible start and end positions. Alternatively, an embodiment produces multiple optimal summaries by finding a first optimal segment, removing that segment from the similarity matrix, and then locating a second optimal summary by finding the optimal segment of the modified similarity matrix. This process is repeated until the desired number of summaries have been produced, or a stopping criteria is met.

In an alternate embodiment, a weighting function is used to find a weighted average similarity as follows:

$$\overline{S}_W(r, q) = \frac{1}{L(r-q)} \sum_{m=q}^{r} \sum_{l=0}^{L} w(l) S(l, m)$$

The weighted average similarity function is maximized as discussed above to find the optimal summary. An examples of weighting function decreases the weight with time in order to favor segments at the beginning of a work over those at the end. For audio, an example weighting function increases the weight with loudness in order to favor louder sections of music, such as tutti (all instruments playing) or choruses, over quieter passages, such as verses. For video, example weighting functions include motion or face detectors, so that summaries are more likely to contain action or people's faces. From these examples, it can be seen that any information known about a work a priori may be incorporated into the weighting function. This allows the weighting function to favor any section which is desirable for inclusion in the optimal summary.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A method for automatically producing an optimal summary of a linear media source, comprising:
   (a) parameterizing the linear media source to produce a parameterized media signal;
   (b) creating a similarity array comprised of a plurality of array elements, wherein each array element includes the value of a similarity measurement between a first portion of the parameterized media signal and a second portion of the parameterized media signal;
   (c) optimizing the value of a segment fitness function over the similarity array in order to find an optimal segment, wherein the segment fitness function is adapted to measure the similarity between a segment of the parameterized media signal and the entire parameterized media signal and is a mathematical function of at least a location of the segment; and
   (d) selecting a portion of the linear media source as the optimal summary, the portion of the linear media source corresponding to the optimal segment.

2. The method of claim 1, wherein Step (a) comprises:
separating the linear media source into a set of media frames;
applying a parameterization to each media frame in order to produce a feature vector representing each media frame; and
aggregating the feature vectors in order to produce the parameterized media signal.

3. The method of claim 2, wherein:
the parameterization of a media frame includes a frequency domain transform.

4. The method of claim 2, wherein:
the parameterization includes assigning a token value to a portion of the media frame.

5. The method of claim 1, wherein Step (a) comprises:
reading a linear media data file containing the linear media source divided into a plurality of media frames, each media frame containing parameterized linear media information;
creating a feature vector for each media frame from the parameterized linear media information contained in each frame; and
aggregating the feature vectors in order to produce the parameterized media signal.

6. The method of claim 1, wherein:
the similarity measurement compnses a measurement of vector similarity between a first feature vector corresponding to the first portion of the parameterized media signal and a second feature vector corresponding to the second portion of parameterized media signal.

7. The method of claim 6, wherein:
the measurement of vector similarity comprises the Euclidean distance between feature vectors in parameter space.

8. The method of claim 6, wherein:
the measurement of vector similarity includes the scalar (dot) product of the feature vectors.

9. The method of claim 6, wherein:
the measurement of vector similarity includes the cosine of the angle between the feature vectors.

10. The method of claim 6, wherein:
the measurement of vector similarity includes applying a Term-Frequency/Inverse Document Frequency weighting to the feature vectors.

11. The method of claim 1, wherein:
the similarity measurement comprises a vector correlation of a first plurality of feature vectors corresponding to the first portion of the parameterized media signal and a second plurality of feature vectors corresponding to the second portion of the parameterized media signal.

12. The method of claim 1, wherein:
the similarity array comprises a two dimensional matrix with each row and each column of the matrix corresponding to a portion of the parameterized media signal, such that each matrix element includes the value of a similarity measurement between a first feature vector, the first feature vector corresponding to the portion of the parameterized media signal associated with the row of the matrix element, and a second feature vector, the second feature vector corresponding to the portion of the parameterized media signal associated with the column of the matrix element.

13. The method of claim 1, wherein:
the segment fitness function comprises the average similarity measurement of a portion of the similarity array, the portion of the similarity array containing a plurality of similarity measurements between a candidate segment and the entire parameterized media signal.

14. The method of claim 13, wherein:
the segment fitness function further comprises a weighting function which emphasizes the similarity measurement for at least one portion of the parameterized media signal corresponding to a desirable portion of the linear media source.

15. The method of claim 1, wherein Step (c) comprises optimizing the value of a segment fitness function using a one-dimensional optimization to find an optimal segment location for a segment of a predetermined length.

16. The method of claim 1, wherein Step (c) comprises:
optimizing the value of a segment fitness function using a one-dimensional optimization to find an optimal segment length for a segment of a predetermined location.

17. The method of claim 1, wherein Step (c) comprises:
optimizing the value of a segment fitness function using a two-dimensional optimization to find an optimal segment location and an optimal segment length.

18. The method of claim 1, further comprising the steps of:
   (e) removing the optimal segment from the similarity array to produce a modified similarity array;
   (f) repeating Steps (b), (c), and (d) with the modified similarity array to produce a second optimal summary of the linear media source.

19. The method of claim 1, wherein:
the linear media source includes video.

20. The method of claim 1, wherein:
the linear media source includes audio.

21. The method of claim 1, wherein:
the linear media source includes text information.

22. An article of manufacture including an information storage medium wherein is stored information, the information comprising:
  a group of processor readable instructions adapted to operate on a processing device, wherein the group of processor readable instructions are adapted to operate the processing device according to the method of claim 1.

* * * * *